US007695369B2

(12) United States Patent
Winkler

(10) Patent No.: US 7,695,369 B2
(45) Date of Patent: Apr. 13, 2010

(54) SYSTEMS AND METHODS FOR ACCESSING ONLINE CONTENT DURING ONLINE GAMING

(75) Inventor: Marvin Winkler, Laguna Hills, CA (US)

(73) Assignee: Planetwide Games, Inc., Los Angeles, CA (US)

( * ) Notice: Subject to any disclaimer, the term of this patent is extended or adjusted under 35 U.S.C. 154(b) by 698 days.

(21) Appl. No.: 11/109,216

(22) Filed: Apr. 18, 2005

(65) Prior Publication Data

US 2006/0111188 A1 May 25, 2006

Related U.S. Application Data

(60) Provisional application No. 60/630,329, filed on Nov. 22, 2004.

(51) Int. Cl.
*A63F 13/12* (2006.01)
*G06F 19/00* (2006.01)

(52) U.S. Cl. ............................ 463/42; 463/29; 463/41; 273/461; 709/203; 709/219; 715/744

(58) Field of Classification Search ..................... 463/1, 463/16, 25, 40–42, 9–13, 20, 29; 705/1, 705/14, 26, 35, 36 R, 37, 42, 77; 273/145 R, 273/147, 141 A, 454–456, 460–461; 902/10, 902/23; 709/203–207, 217–219, 225, FOR. 106, 709/FOR. 115, FOR. 122, FOR. 130, FOR. 131, 709/FOR. 132, FOR. 141, FOR. 148, FOR. 149, 709/FOR. 153; 715/744, 758; 704/E15.047; 340/7.1, 7.2, 7.21, 7.28, 311.1, 311.2, 426.21, 340/572, 825.29, 825.44; *G06F 17/00, 19/00; A63F 013/00, 09/24, 13/12*

See application file for complete search history.

(56) References Cited

U.S. PATENT DOCUMENTS

| | | | | |
|---|---|---|---|---|
| 5,695,400 | A | 12/1997 | Fennell, Jr. et al. | |
| 6,557,041 | B2 | 4/2003 | Mallart | |
| 6,745,236 | B1 * | 6/2004 | Hawkins et al. | 709/218 |
| 6,758,746 | B1 * | 7/2004 | Hunter et al. | 463/9 |
| 6,845,389 | B1 | 1/2005 | Seu et al. | |
| 6,878,067 | B2 * | 4/2005 | Blanco | 463/43 |
| 6,941,324 | B2 * | 9/2005 | Plastina et al. | 707/104.1 |
| 6,951,516 | B1 * | 10/2005 | Eguchi et al. | 463/40 |
| 7,090,576 | B2 * | 8/2006 | Herbrich et al. | 463/1 |

(Continued)

OTHER PUBLICATIONS www.musicgremlin.com [Nov. 18, 2003][online].*

(Continued)

*Primary Examiner*—Peter DungBa Vo
*Assistant Examiner*—Arthur O. Hall
(74) *Attorney, Agent, or Firm*—Hani Z. Sayed; Rutan & Tucker, LLP

(57) ABSTRACT

Systems and methods for accessing online content during online gaming are disclosed. In one embodiment, online gamers are able to access available online music content while in-game. Player-selected music content may be played and incorporated directly into the online RPG/MMORPG gaming experience. Players desiring to access additional music content to be played while in-game may be directed to a third-party server, from which the desired music content may be selected and/or downloaded. The selected music content may then replace the generic background music to which all other players are limited.

19 Claims, 6 Drawing Sheets

U.S. PATENT DOCUMENTS

| | | | | |
|---|---|---|---|---|
| 7,096,234 | B2 * | 8/2006 | Plastina et al. | 707/104.1 |
| 7,464,272 | B2 * | 12/2008 | Danieli | 713/182 |
| 7,465,231 | B2 * | 12/2008 | Lewin et al. | 463/37 |
| 7,480,727 | B2 * | 1/2009 | Domschitz | 709/231 |
| 2003/0013526 | A1 * | 1/2003 | Galyean et al. | 463/40 |
| 2003/0013527 | A1 * | 1/2003 | Rowe et al. | 463/42 |
| 2003/0037157 | A1 * | 2/2003 | Pestoni et al. | 709/231 |
| 2003/0038805 | A1 * | 2/2003 | Wong et al. | 345/473 |
| 2004/0143852 | A1 * | 7/2004 | Meyers | 725/133 |
| 2004/0210634 | A1 * | 10/2004 | Ferrer et al. | 709/204 |
| 2005/0037841 | A1 * | 2/2005 | de Waal et al. | 463/29 |
| 2005/0080898 | A1 * | 4/2005 | Block | 709/225 |
| 2005/0137015 | A1 * | 6/2005 | Rogers et al. | 463/42 |
| 2007/0202951 | A1 * | 8/2007 | Bogosian et al. | 463/42 |

OTHER PUBLICATIONS www.mmorpg.com [Nov. 28, 2002][online].*

* cited by examiner

SYSTEMS AND METHODS FOR ACCESSING ONLINE CONTENT DURING ONLINE GAMING

CROSS REFERENCE TO RELATED APPLICATION

This application claims the benefit of U.S. Provisional Patent Application Ser. No. 60/630,329 filed on Nov. 22, 2004.

FIELD OF THE INVENTION

This invention relates generally to consumer inquiries, and in particular to a system and method for accessing online content while participating in online gaming activities.

BACKGROUND OF THE INVENTION

A virtual world environment (VWE) is a computer-generated reality comprised of graphics, images, video and/or audio data which are all used to define the virtual world. Typically, the VWE is presented to users on a computer screen once the user has accessed the virtual world. When multiple users have accessed the same VWE, they may perceive and interact with each other from their individual computer systems connected to a common network.

One form of VWEs are online role playing games (RPGs) which can be traced back to the 1970s to non-graphical online multi-user dungeon (MUD) games, to text-based computer games such as Adventure™ and Zork™, and to pen and paper role-playing games like Dungeons & Dragons.™ RPGs are games where players assume the roles of fictional characters via role-playing. At their core, these games are a form of interactive and collaborative storytelling. Whereas cinema, novels and television shows are passive, role-playing games engage the participants actively, allowing them to simultaneously be audience, actor, and author. Each player's character has a number of characteristics, often including strength, intelligence, charisma, and various paranormal traits. The exact abilities vary by game. Numerical values assigned to these characteristics reflect the character's learned and intrinsic attributes and abilities, and can be used during game play to evaluate the outcome of various chance events. In most game systems most or all of these characteristics can be improved in some way via gameplay, usually by gaining experience points for completing certain objectives.

Massively multiplayer online role-playing game (MMORPG) are a more recent incarnation of online RPGs which enable thousands of players to play in an evolving virtual world at the same time over a network, such as the Internet. Although VWEs may be displayed in two dimensions, three-dimensional VWEs have become increasingly popular. In addition, some VWEs use rendered geometric models and audio data to provide both a visual and auditory 3D perspective for the user.

In order to access an online RPG, such as an MMORPG, players must run a client on their local computer systems to connect to the VWE, which is generally hosted by the game's publisher, manager or director. The virtual worlds they create are called "persistent worlds", meaning that the world continues regardless of who is logged in or not. When a player logs in, they are represented in the game world by an "avatar," which is a graphical representation of an online user in the VWE. The avatar may be a scanned image of the user's face or any other computer-generated graphic for that matter.

Most online RPGs run several identical copies of the virtual world, called "shards" or "servers," from which the player may choose. In this fashion, the player is able to shape their own experience by providing multiple (or customizable) avatars from which the player may select. Once a player enters the VWE, they can engage in a variety of activities on their own, or with other players who are concurrently accessing the same VWE. The game host will generally supervise the virtual world and continually offer players new activities and enhancements to experience. Game hosting has become a multi-million dollar a year venture with most online RPGs being commercial in nature. That is, a user must pay a subscription fee, which is often done on an hourly basis or a monthly basis, in order to continue to access the VWE.

While the gaming experience has been dramatically improved over the years in many respects, there is currently little progress made towards enabling online players to access and experience online content such as music while in-game. Thus, there is a need for an improved system and method for accessing online content during online gaming.

SUMMARY OF THE INVENTION

Systems and methods for performing accessing online content during online gaming are disclosed. In one embodiment, a method includes providing access to a virtual world environment, and streaming personalized content to a subset of users accessing the virtual world environment. The method also includes directing the subset of users to a third-party server from which the personalized content is available for download, and then enabling the subset of users to download the personalized content from the third-party server while still in the virtual world environment.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
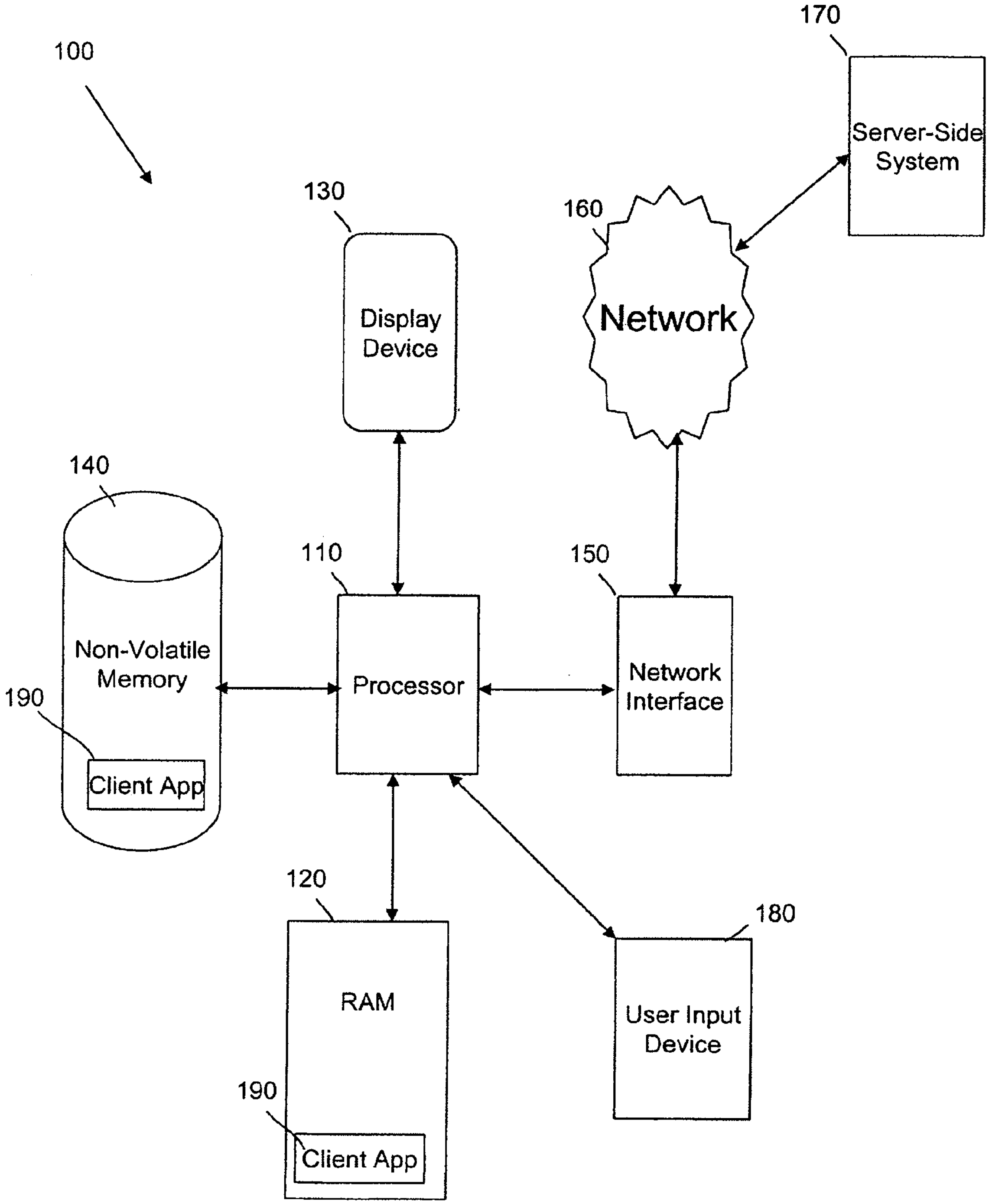
FIG. 1 is one embodiment of a computer system capable of being used to carry out one or more aspects of the invention.

One aspect of the invention is personalize the audio experience for online RPG/MMORPG gamers, as well as other VWEs. In one embodiment, users are able to access available online music content while in-game or from within a VWE. In one embodiment, users desiring to access additional music content to be played while in the VWE (e.g., in-game) may be directed to a third-party server, from which the desired music content may be selected and/or downloaded. The selected music content may then replace the generic background music to which all other users are limited while in the VWE. The source of the downloaded music or stream could be represented in the game as an avatar or storefront, or outside the VWE as a website. In either representation, audio files may be downloaded to the player's system with the downloaded files being used as a background music source for the VWE.

Another aspect of the invention is to enable a gaming host (as known as the "game master" or "game lord") to customize the audio experience for online gamers. Since MMORPG environments are typically hosted on a remote server maintained by a game host, this game host may selectively stream particular music content to particular groups or sub-groups of online players. The music content can be defined as a single music file or a playlist of music files. This game-host-selected music content may then replace the generic background music to which all other players are limited. It should equally be appreciated that hosts of VWEs other than MMORPGs may similarly select and stream particular music to particular users. The VWE host may also present the user with several "channels" of streaming music from which the group or sub-group of user can choose.

In one embodiment, users may choose to download music content which has been selectively streamed to them by the VWE host while in the VWE (e.g., while in-game). Such content may be stored locally on the user's computer system, or may alternatively be stored on a third-party server for later access by the user.

The number of streams or downloads that are made available to the users can vary. In one embodiment, a user may be "locked" into a single stream or be opened to multiple streams from multiple sources. In order to facilitate the easy selection of files or streams while in-game, the VWE may permit an accelerated command that gives the user an easy method to select from the different audio sources. In one embodiment, the user would press a key combination of "control-key-number" that would quickly move the audio from the current stream to the one identified by "number." In another embodiment, the player would type in a command (e.g., to a game chat or command line) that would change channels. The command may follow the conventions of other command line commands (commonly called "slash" commands).

Still another aspect of the invention is to provide a quick method of selecting content from a stream while the user is in the VWE (e.g., while a player is in-game). When a user is listening to an audio stream and they are interested in a particular track that is being broadcast on the stream, the user may be given the ability to 'mark' that track for later action. In one embodiment, the marking of the track may occur in a way similar to that of the audio channel (or file) selection mentioned above (i.e., a key combination entered by the user). In another embodiment, a command line command may be used to mark a desired audio track. Once the audio track is marked, a client application or server-side script may add the track to a play list and keep the list for the user. Such a list of marked audio tracks may be presented and/or available to the user on demand. In one embodiment, the list can be used to fill a shopping cart for music track purchase. In another embodiment, such a list may represent an on-demand list of music for the next time the user enters the VWE.

When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

As discussed herein, a "computer" or "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. In addition, a "communication link" refers to the medium or channel of communication. The communication link may include, but is not limited to, a telephone line, a modem connection, an Internet connection, a digital subscriber line (DSL), an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

The present disclosure relates to any application that renders a VWE, such as an online RPG, MMORPG, or any other form of a virtual environment. Typically the VWE will be experienced by a user through a client application executing on a user computer, such as computer system 100. It should be appreciated that computer system 100 may comprise any personal desktop computer, notebook computer, work station, or other digital computer system that includes a processor or a central processing unit (CPU) 110, which may include an arithmetic logic unit (ALU) for performing computations, a collection of registers for temporary storage of data and instructions, and a control unit for controlling operation for the computer system 100. In one embodiment, the processor 110 includes any one of the x86, Pentium™ class microprocessors as marketed by Intel™ Corporation, microprocessors as marketed by AMD™, or the 6×86MX microprocessor as marketed by Cyrix™ Corp. In addition, any of a variety of other processors, including those from Sun Microsystems, MIPS, IBM, Motorola, NEC, Cyrix, AMD, Nexgen and others may be used for implementing processor 110. Moreover, the processor 100 need not be limited to microprocessors but may take on other forms such as microcontrollers, digital signal processors, reduced instruction set computers (RISC), application specific integrated circuits, and the like. Although shown with one processor 110, it should equally be appreciated that computer system 100 may alternatively include multiple processing units.

The processor 110 is shown as being coupled to random access memory 120, which may include synchronous dynamic random access memory (SDRAM). The processor is also coupled to a display device 130, which may be a television, monitor, LCD screen or any other display screen capable of displaying rendered graphics and text. Although not shown, user computer may also include a graphics controller, a graphics engine, a video controller and/or video memory.

The processor 110 is also coupled to non-volatile memory 140 which may include (but not be limited to) a hard disk, floppy disk, CD-ROM, DVD-ROM, tape, high density floppy, high capacity removable media, low capacity removable media, solid state memory device, etc., and combinations thereof. The network interface 150 may include a network interface card (NIC), a modem interface, integrated services digital network (ISDN) adapter for high-speed data transmission used to exchange data with other computer systems, including server-side system 170, coupled to network 160.

The user input device 180 may include a keyboard, mouse, joystick and the like for enabling a user to interact with and provide commands to the computer system 100. Computer system 100 may further include system firmware, such as system BIOS, for controlling, among other things, hardware devices in the computer system 100. The system firmware may include ROM and/or flash (or EEPROM) memory.

As is familiar to those skilled in the art, the computer system 100 may further includes an operating system (OS) and at least one application program, which in one embodiment, are loaded into RAM 120 from non-volatile memory 140. The OS may include any type of OS including, but not limited or restricted to, DOS, Windows, Unix, Linux, Xenix, etc. The operating system is a set of one or more programs which control the computer system's 100 operation and the allocation of resources. The application program is a set of one or more software programs that performs a task desired by the user. Additional details of user computers are not required to fully disclose the present invention, since such devices are generally well known to those of ordinary skill in the art.

Typically, a client application (e.g., client app 190) that is usable to implement one or more aspects of the invention would be loaded into RAM 120 from non-volatile memory 140 (e.g., hard drive, removable floppy disk, CD-ROM, etc.). Once loaded into RAM 120, the computer-readable instructions which comprise the client app 190 may be executed by processor 110. The user may then interact with the client app 190 (and hence the VWE) by providing one or more inputs via the aforementioned user input device 180. The client app 190 may reside completely in RAM 120, completely in non-volatile memory 140, or may reside partly in RAM 120 and partly in non-volatile memory 140. In one embodiment, client app 190 is usable to graphically render a VWE that includes various artifacts, objects, avatars, rooms and other virtual representations.

Figure 2:
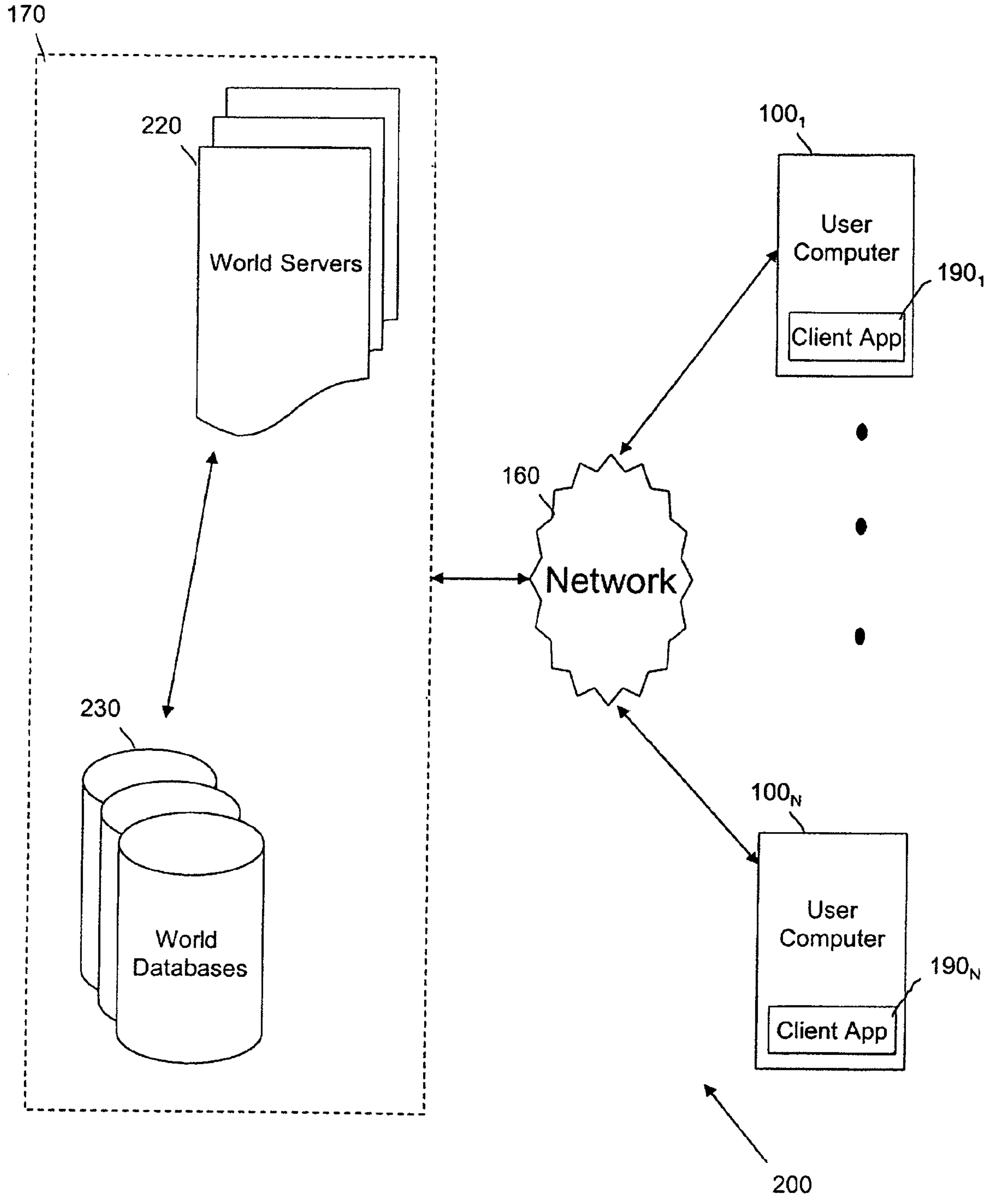
FIG. 2 is one embodiment of client-server system capable of implementing one or more aspects of the invention.

Referring now to FIG. 2, depicted is one embodiment of a client-server system 200 capable of implementing one or more aspects of the invention. System 200 includes server-side system 170 in communication with a plurality of user computers $\mathbf{210}_1$-$\mathbf{210}_N$ ("210") via network 160, as previously described. Server-side system 170 includes one or more world servers 220 which continuously update one or more world databases 230. In one embodiment, world databases 230 contain data which can be used to represent the current version of the entire VWE or world.

As previously mentioned, in one embodiment each of the user computers 210 may each execute a client application $\mathbf{190}_1$-$\mathbf{190}_N$ that are usable to access the world servers 220 and the VWE's they maintain. In addition, each of the user computers may maintain a local database which includes a subset of the information contained in a corresponding world database 230. While in one embodiment each of the world servers 220 may individually be used to serve a VWE, in another embodiment a network of distributed servers may be used to administer the VWE and corresponding world database 230.

World servers 220 may be used to download the client applications 190 and/or a portion of the VWE's world database 230 to a large number of individual user computers 210. User manipulations of the VWE (e.g., adding, deleting, or moving objects within the VWE) may be handled automatically by the world server 220 to which the user computer's client application 190 is connected.

Figure 3:
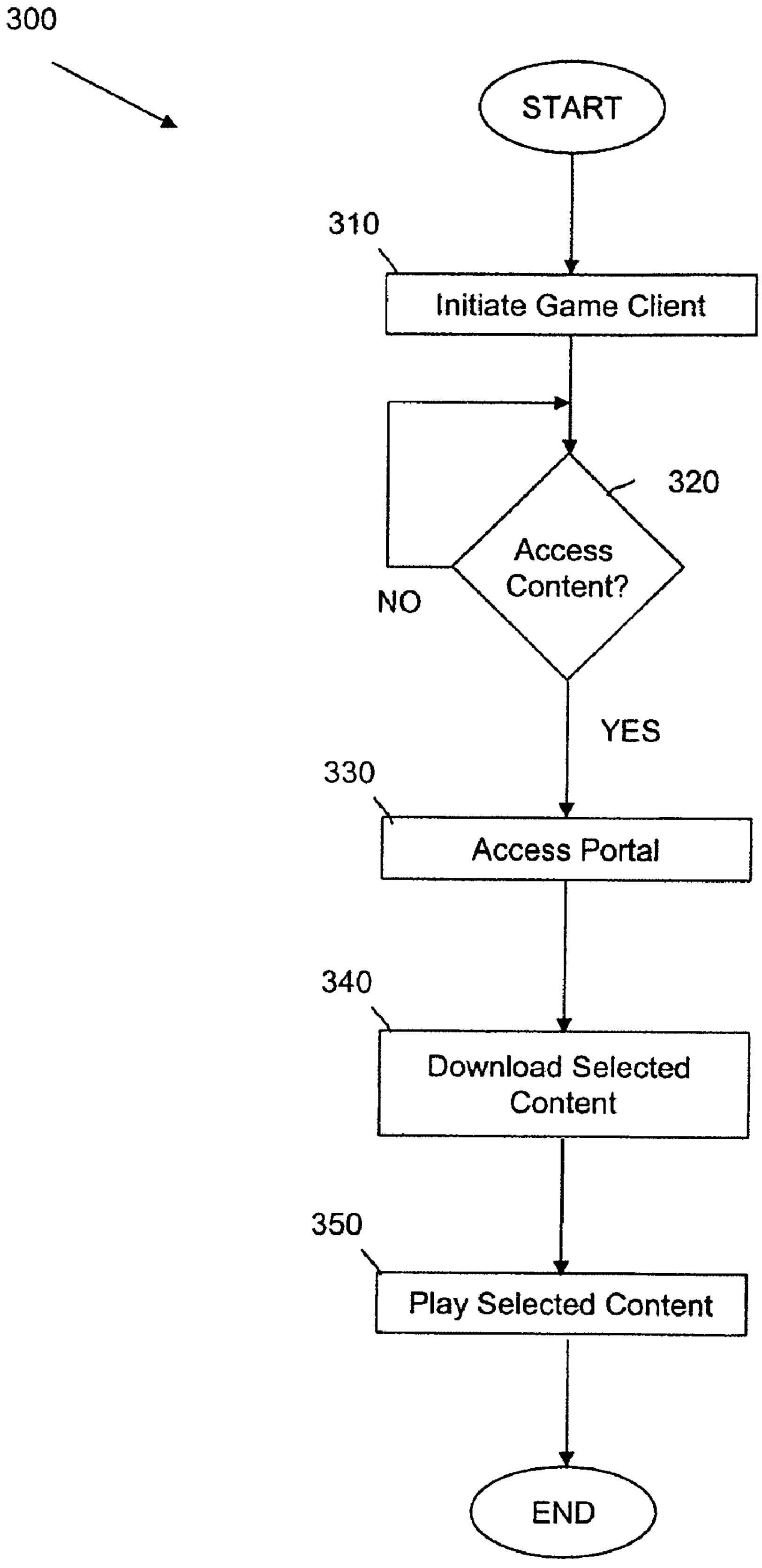
FIG. 3 depicts one embodiment of a process for how content may be accessed during online gaming.

Referring now to FIG. 3., depicted is one embodiment of a process 300 for accessing music content for personalizing the in-game listening experience. While it should be understood that process 300 may equally be applicable to any type of a VWE other than an online gaming environment, for simplicity the following description is provided in terms of online gaming and personalizing audio content while in-game.

Process 300 begins at block 310 where the game and/or gaming client (e.g., client app 190) is initiated. It should be appreciated that this may involve varying sign-in and/or game client execution operations. Regardless of the method by which the player enters the online gaming environment, once complete, process 300 will then continue to block 320 where a determination is made as to whether the player desires to access available online music content. In one embodiment, this determination involves a player selection of a button, icon, keystroke, etc. while in-game.

Once the player has indicated a desire to download available online music content, process 300 may continue to block 330 where a third-party portal may be accessed. In one embodiment, the third-party portal is a web site of a music content provider. It should be appreciated that the third-party portal may be accessible separate from the gaming interface or through a network connection, such that the player remains in-game at all times during the process 300. In another embodiment, the third-party portal is accessed using a web browser.

Once at the third-party portal, the player may browse and select from the available music titles. Process 300 may then continue to block 340 where the selected content is downloaded by the player. In one embodiment, there may be a fee associated with downloading the content. In another embodiment, rather than downloading the content, the content may be streamed to the player's computer from one of the third-party's servers.

At this point, process 300 moves to block 350 where the selected music content (whether downloaded or streamed) is played while the player continues with in-game activities. In one embodiment, the selected music content is incorporated into the gaming experience by replaces the previously played generic background music.

Figure 4:
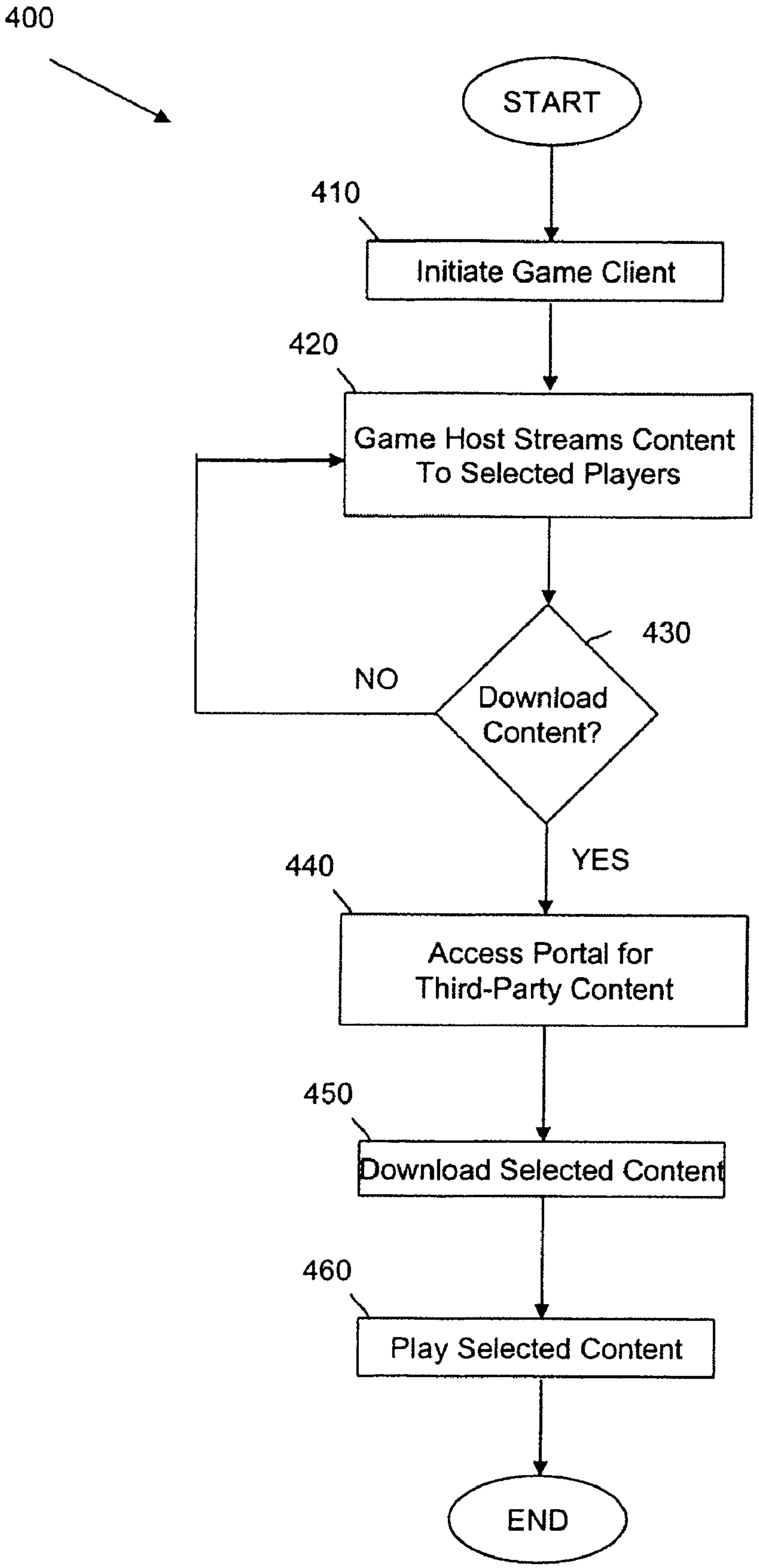
FIG. 4 depicts another embodiment of a process for how content may be accessed during online gaming.

FIG. 4 is another embodiment of a process 400 for how a game host for accessing music content for customizing the in-game listening experience. In this embodiment, process 400 begins at block 410 with players entering the game environment, which in one embodiment involves loading a gaming client (e.g., client app 190) and entering access information (e.g., username, password, etc.). Once in-game, the game host may desire to stream customized music content to selected in-game players (block 420). This content may be representative of the current gaming scenario for the selected players, or may be selected based on any number of other criteria. As the players continue their gaming experience, while listening to the personalized music content provided by the game host, at block 430 the players may be provided with the opportunity to download the music content while still in-game.

If a player has indicated that they would like to download some or all of the music content being streamed to them by the game host, process 400 will continue to block 440 where the player may be able to access a third-party music content portal. In one embodiment, this portal may be a website from which music content may be downloaded, whether for a fee or otherwise. In one embodiment, a user account is accessed prior to being able to download music content, while in another embodiment, the player is able to directly access a sub-page of the music content portal. In any event, once the third-party content portal has been accessed the player may download the selected music content while still in-game at block 450. The downloaded selected content may then be played by the user at block 460. As with previously described process 300, it should be appreciated that process 400 may be equally applicable to any type of a VWE.

Figure 5A:
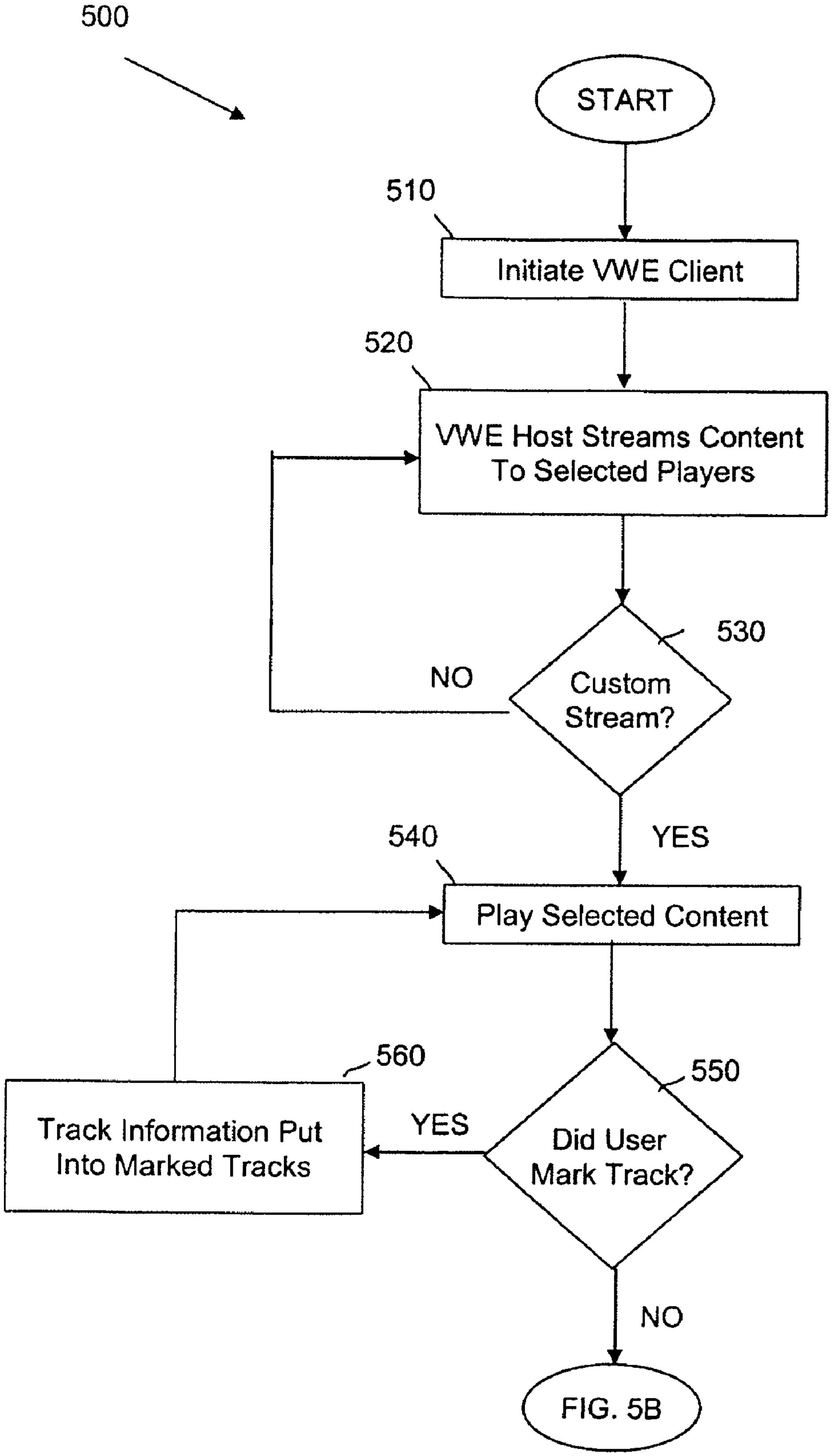
FIGS. 5A-5B depict one embodiment of a process for how streamed content may be marked from within a VWE.
Figure 5B:
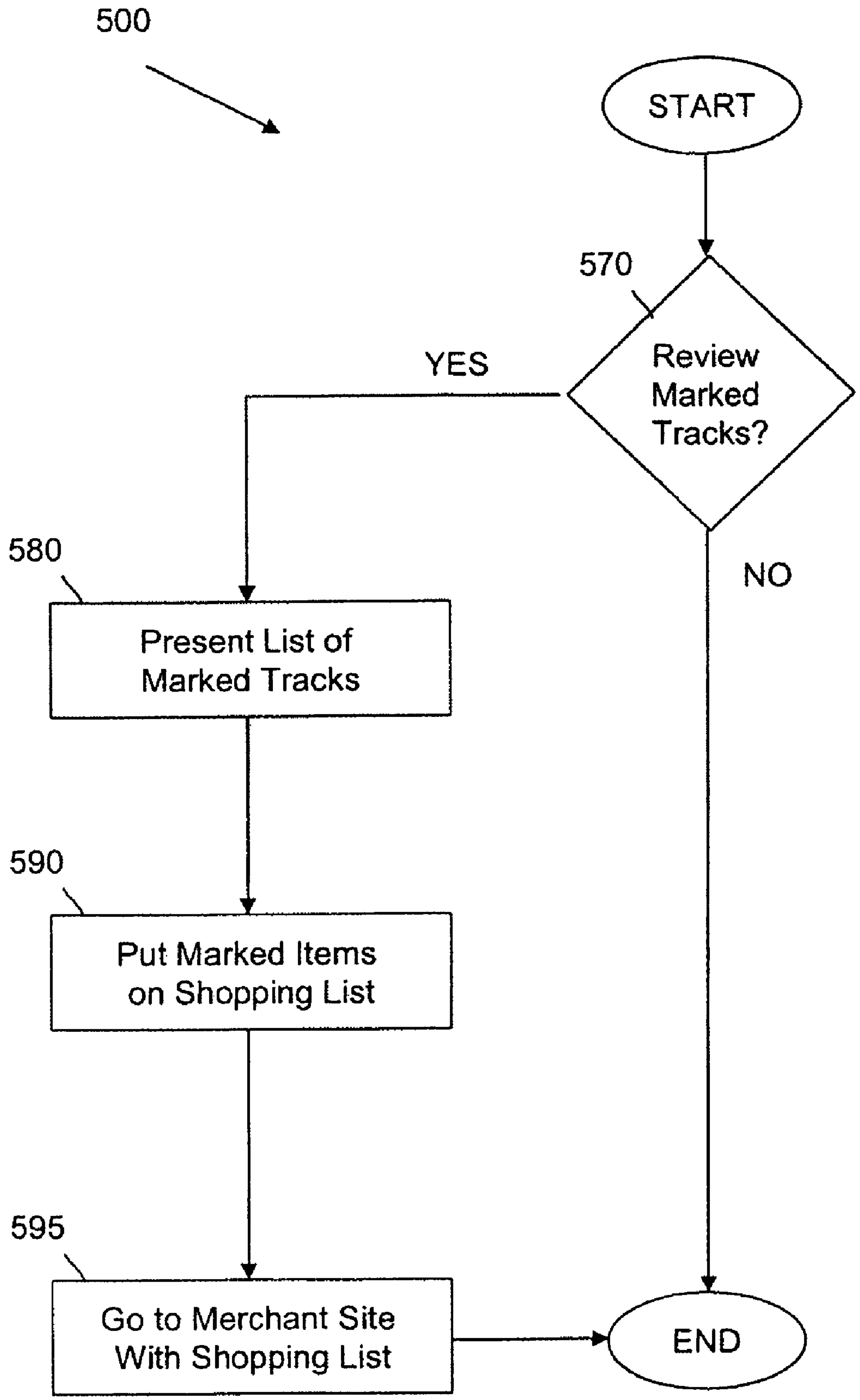

FIGS. 5A-5B describe a process for how streamed content may be marked from within a VWE, such as an online RPG. In one embodiment, an online gamer may use process 500 to "mark" tracks when selecting to have particular audio streamed to them while in-game, as previously described with reference to FIGS. 3 and 4.

Referring now to FIG. 5A, process 500 begins at block 510 with the user entering the VWE (e.g., player entering a game environment), which in one embodiment involves loading a client application on the user's computer system and entering access information. Once the user has entered the VWE, the host (e.g., game host) may desire to stream customized/personalized music content to online users at block 520. As the users continue their VWE experience, while listening to the customized music content provided by the VWE host, a determination may be made at block 530 as to whether the user will be provided with the opportunity to select different music content while still in the VWE. If not, then the host's content selection will continue to be streamed to the user with process 500 returning to block 520. If, on the other hand, the user is to be provided with the ability to customize the content stream, then process 500 will continue to block 340 where the user will begin listening to the user-selected content.

Once the user-selected content begins playing, process 500 will move to block 550 where a determination is made as to whether the user has indicated (e.g., using a command or keystroke) that they would like to "mark" a particular track from the currently selected audio stream. If the user has marked a particular track, process 500 will move to block 560 where the relevant track information may be collected from the metadata or other stream information and put into a play list. This play list may be a locally maintained list or grouping of marked audio tracks, or may alternatively be maintained remotely (e.g., by server-side system 170). In one embodiment, whenever a user is in the VWE (e.g., in-game) or when they exit the VWE, the user may be given the opportunity to review their play list and choose from among a plurality of possible actions.

Where the user has not marked a track nor indicated a desire to mark a track, process 500 continues to block 570 of FIG. 5B. At this point, users may be given the ability to review previously marked tracks. While in one embodiment, marked tracks are presented to the user when requested, in another embodiment a marked-tracks list may be automatically presented to the user.

In the event that it is determined at block 570 that the user is to be presented with the marked-tracks list or play list, process 500 will continue to block 580 where the list of "marked" tracks is presented to the user. [WHAT ARE THE POSSIBLE WAYS IN WHICH THESE TRACKS MAY BE PRESENTED?]

Continuing to refer to FIG. 5B, the list of marked tracks may then be used to populate a "shopping list" that can then be sent, for example, to a merchant site (block 390). In one embodiment, this may provide the user with an efficient method for listening and "marking" audio tracks while in a virtual environment for later use/purchase. Thereafter, at block 595 the user is free to visit the merchant site to which the "shopping list" was sent. In one embodiment, the "shopping list" is used to populate or otherwise be added to a list of items designated for purchase from the merchant site. Moreover, it should be appreciated that the user may be automatically directed to the merchant site while in the VWE, may be directed to the merchant site after exiting the VWE, or may be free to manually visit the merchant site at their convenience.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for accessing online content during online gaming, the method comprising the steps of:

providing, using a server, access to a virtual world environment;

determining, using a server, whether a user of a subset of users will be provided with the opportunity to select different music content when the user inputs access information into a user's computer system while the user is in the virtual world environment;

streaming, using a server, personalized content to the user of said subset of users who accesses said virtual world environment after the user is provided with the opportunity to select the different music content;

allowing the user to select different music content when the user inputs access information into a user's computer system while the user is in the virtual world environment;

directing, using a server, the user of said subset of users to a third-party server from which said personalized content is available for download; and enabling, using a server, the user of said subset of users to download said personalized content from multiple sources and select from different music content of said personalized content from said third-party server to the user's computer system while still in said virtual world environment, wherein said personalized content is stored locally on the user's computer system or stored by a third party on said third-party server for access by the user from the third-party server to customize the users virtual world environment experience, and wherein the selected, different music content from the personalized, downloaded content is used to replace the generic background music of the online game while the user is in game.

2. The method of claim 1, wherein providing access to the virtual world environment comprising permitting a client application executing on a user computer to access said virtual game environment over a network connection.

3. The method of claim 2, further comprising generating said virtual game environment by a server-side system that is accessible via said network connection by a plurality of users which includes said subset of users.

4. The method of claim 1, wherein streaming personalized content comprises streaming an audio file to the subset of users and streaming a different audio file to a group of users different than said subset of users.

5. The method of claim 1, wherein streaming personalized content comprises streaming a plurality of channels of audio content from which online users may select a particular channel to listen.

6. The method of claim 1, wherein said virtual world environment is an online role playing game environment.

7. The method of claim 1, further comprising receiving a request from an online user to mark a track of said personalized content.

8. The method of claim 7, further comprising: populating a list with said track, wherein said list is comprised of one or more marked tracks; and sending said list to an online merchant server from which said online user may purchase said one or more marked tracks.

9. The method of claim 8, wherein sending said list comprises automatically populating a virtual shopping cart of said online user for said online merchant server.

10. The method of claim 7, further comprising: computer readable program code to populate a list with said track, wherein said list is comprised of one or more marked tracks; and computer readable program code to send said list to an online merchant server from which said online user may purchase said one or more marked tracks.

11. The method of claim 7, wherein said computer readable program code to send said list comprises computer readable program code to automatically populate a virtual shopping cart of said online user for said online merchant server.

12. A system comprising:

a network;

a plurality of user computers coupled to the network allowing for the plurality of users to simultaneously participate in online game play;

a server in communication with said plurality of user computers over said network, wherein said server is configured to:

generate a virtual world environment for access by said plurality of user computers;

determine whether a user of a subset of users of said plurality of user computers will be provided with the opportunity to select different music content when the user inputs access information into a user's computer system while the user is in the virtual world environment;

stream personalized content to the user of said subset of users of said plurality of user computers while the user accesses said virtual world environment after the user is provided with the opportunity to select the different music content so as to customize the user's online game play experience;

allow the user to select different music content when the user inputs access information into a user's computer system while the user is in the virtual world environment;

direct the user of said subset of users to a third-party server from which said personalized content is available for download; and enable the user of said subset of users to download said personalized content from multiple sources and select from different music content of said personalized content from said third-party server to the user's computer system while still in said virtual world environment, wherein the personalized content is stored on the user's computer system or stored by a third party on said third-party server for later access by the user to customize the users virtual world environment experience while the user is still in said virtual world environment, and wherein the selected, different music content from the personalized, downloaded content is used to replace the generic background music of the online game while the user is in game.

13. The system of claim 12, wherein said plurality of user computers is to access said virtual world environment over said network by executing a client application.

14. The system of claim 12, wherein said server is to stream an audio file to the subset of plurality of user computer and to stream a different audio file to a second subset of said plurality of user computer.

15. The system of claim 12, wherein said server is to further stream a plurality of channels of audio content from which online users may select a particular channel to listen.

16. The system of claim 12, wherein said virtual world environment is an online role playing game environment.

17. The system of claim 12, wherein said server is to further receive a request from an online user to mark a track of said personalized content.

18. The system of claim 17, wherein said server is further to, populate a list with said track, wherein said list is comprised of one or more marked tracks, and send said list to an online merchant server from which said online user may purchase said one or more marked tracks.

19. The system of claim 18, wherein said list is used to automatically populate a virtual shopping cart of said online user for said online merchant server.

* * * * *